Jan. 10, 1928.

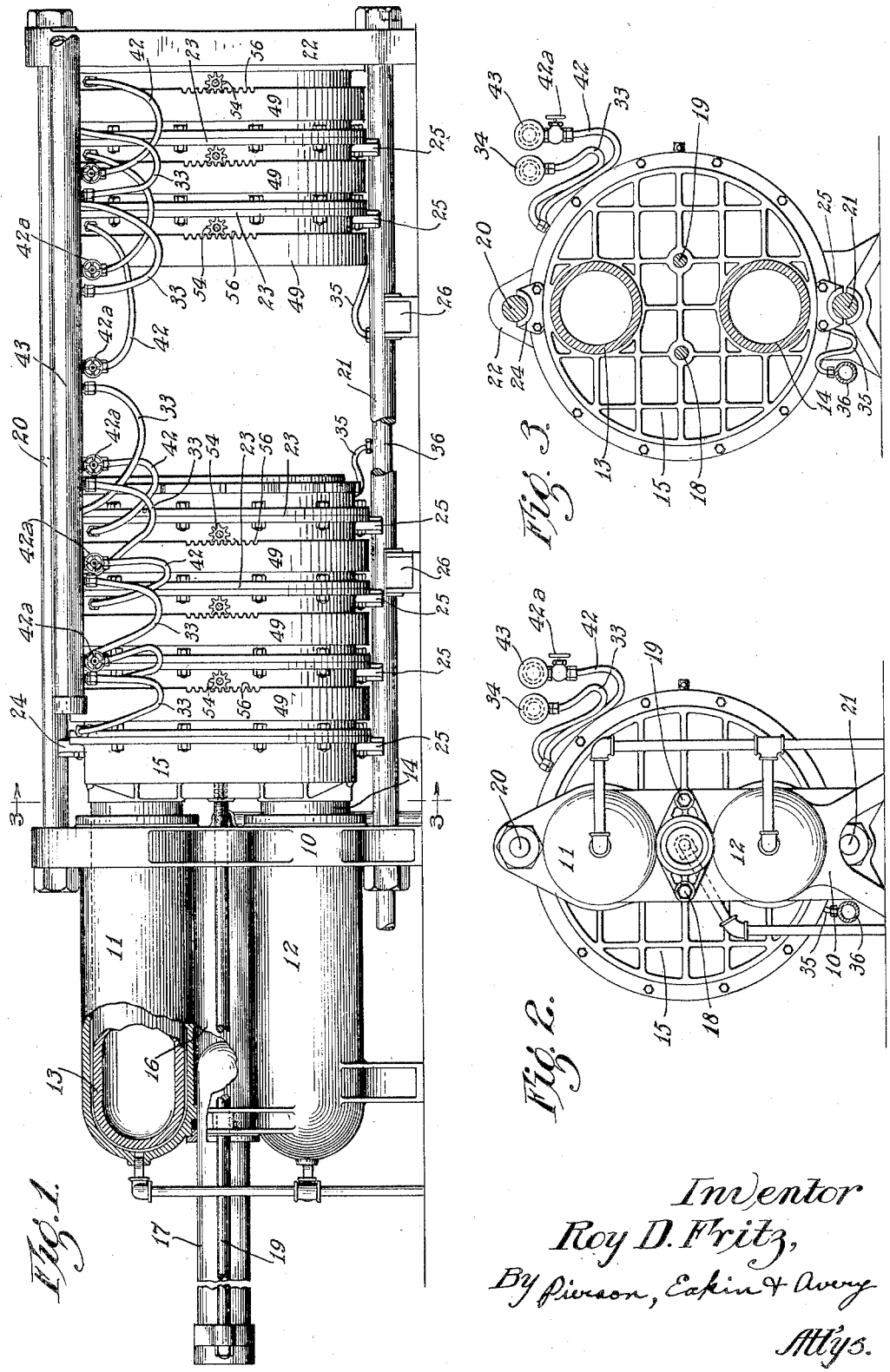

R. D. FRITZ 1,655,861

MOLDING AND VULCANIZING APPARATUS

Filed Sept. 1, 1925 2 Sheets-Sheet 2

Inventor
Roy D. Fritz
By Pierson, Eakin &
Avery, Attys.

Patented Jan. 10, 1928.

1,655,861

UNITED STATES PATENT OFFICE.

ROY D. FRITZ, OF AKRON, OHIO, ASSIGNOR TO THE B. F. GOODRICH COMPANY, OF NEW YORK, N. Y., A CORPORATION OF NEW YORK.

MOLDING AND VULCANIZING APPARATUS.

Application filed September 1, 1925. Serial No. 53,916.

This invention relates to the art of molding articles, as in the vulcanizing of pneumatic or other rubber tires or inner tubes, where the article requires to be held in the mold for a considerable time while the material sets in its molded shape.

Heretofore it has been proposed to mount a series of pneumatic tires or the like in a series of mold cavities defined by a set of substantially aligned and abutted mold members, to hold the latter in such relation by yielding pressure, and to force adjacent mold members apart, against such yielding pressure, to open one mold cavity after another for removing a vulcanized article from the cavity and substituting an unvulcanized article, so that the mold members may be continuously heated and kept in substantially continuous vulcanizing service.

My chief objects are to provide improved and simplified apparatus of this general type, to provide for greater facility of operation, and to provide economy of floor space and economy of power in the opening and closing of the mold cavities. A more specific object is to provide for detachably locking adjacent mold members together, so that one after another of the mold cavities may be opened while articles contained in the others continue to be vulcanized, without requiring a constant yielding pressure upon the set of mold members or the opening of mold cavities against such pressure.

Of the accompanying drawings:

Fig. 1 is a side elevation of the preferred embodiment of my apparatus, parts being sectioned and broken away.

Fig. 2 is an end elevation of the same.

Fig. 3 is a section on line 3—3 of Fig. 1.

Figure 4:
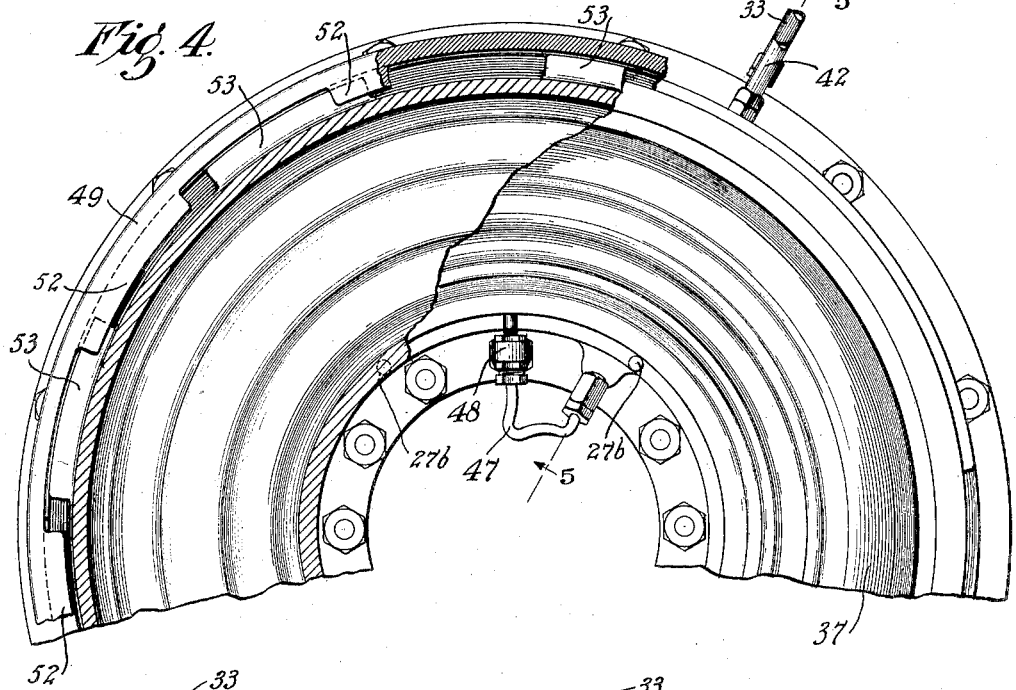
Fig. 4 is a fragmentary view, on a larger scale, of mold members with a tire therein, parts being sectioned on line 4—4 of Fig. 5 and broken away.

Referring to the drawings, the apparatus comprises an end standard 10 in which are secured a pair of twin ram cylinders 11, 12, which are preferably formed integrally, as shown, for a pair of rams 13, 14, which have their heads secured to a press-head 15 common to the two, the two rams together being adapted strongly to force the press-head in a direction away from the standard 10.

Mounted between the ram cylinders 11, 12, and preferably formed integrally therewith, as shown, is a ram cylinder 16, which may be of comparatively small section, for a reversely acting ram 17, which is connected with the press-head 15 by pull rods 18, 19, for retracting the press-head toward the standard 10.

A pair of tie rods 20, 21, constituting guides for the set of mold members, are secured at one end in the standard 10 and at the other in a standard 22 which constitutes a stationary press-head, the mold members, shown at 23, 23, being provided with guide shoes 24, 24, 25, 25, on their outer peripheries, slidably fitting the said tie rods or guides. Floor brackets 26, 26, are provided at intermediate positions under the lower guide 21 to prevent undue sagging of the guide under the weight of the mold members.

Each of the mold members, for convenience of construction, consists of two hollowed, flanged, annular sections 27, 28, bolted together upon annular, marginal sealing gaskets 29, 30, (see Figs. 4 and 5) and thus enclosing a steam chamber 31, which is connected, through a passage 32 in the outer peripheral wall of the section 28 and through a flexible pipe 33, with a manifold steam pipe 34 disposed along the set of mold members and supported by any suitable means (not shown). Flexible pipes 35, 35, leading from the bottoms of the respective steam chambers to an outlet manifold 36, are provided for venting water of condensation.

Figure 5:
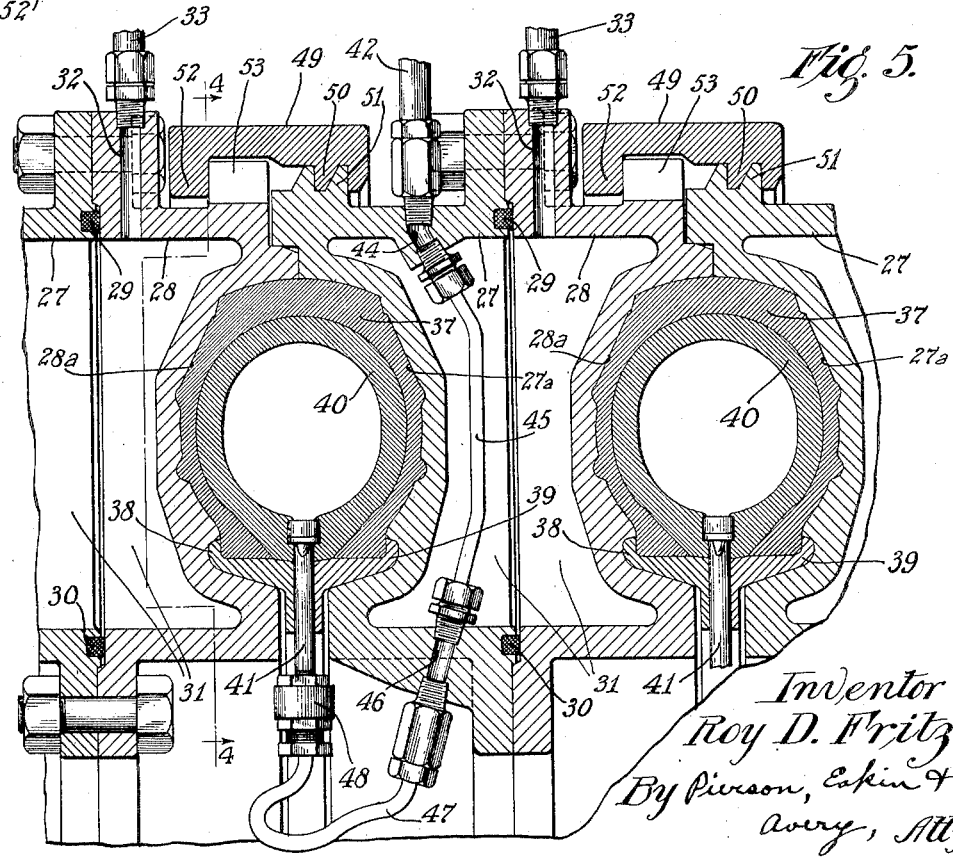
Fig. 5 is a section on line 5—5 of Fig. 4.

The outer side face of each of the mold sections 27, 28, is formed with a mold cavity, 27$^a$ or 28$^a$, so that adjacent mold members are adapted to coact with each other as the sections of a two part mold, to enclose an article such as the pneumatic tire 37. Each tire is shown as being mounted upon bead clamping rings 38, 39, of a common type, and as containing the usual expansible core 40, having an inlet stem 41. Studs 27$^b$, 27$^b$, Fig. 4, are provided on the mold section 27 near its inner periphery to facilitate the mounting and removal of the tire assemblies.

For conducting pressure fluid into each of the expansible cores a flexible pipe 42, provided with a stop-cock 42$^a$, leads from a manifold 43 disposed along the set of mold members, the other end of the flexible pipe being connected with a fluid passage 44 which extends through the outer peripheral wall of the mold section 27 and is connected by a pipe 45, extending through the steam chamber 31, with a passage 46 extending through the inner peripheral wall of the mold section, the passage 46 having communication with a flexible pipe 47 which is coupled at its other end to the inlet stem 41 of the expansible core, by a quick-detachable coupling 48.

The preferred means here shown for locking together adjacent mold members is of the breech-block type and comprises an annular locking ring 49 formed at one side with an internal screw thread 50 which is screwed upon a complemental thread 51 formed upon the exterior of the mold section 27, the opposite margin of the locking ring being formed with inwardly projecting lugs 52, 52, adapted to pass between lugs 53, 53, formed on the exterior of the section 28 of the adjacent mold member, as the two mold members are brought together, and then to be inter-locked with the lugs 53 and at the same time tightened thereagainst by rotation of the locking ring 49.

For so rotating the locking ring 49 a pinion 54, provided with the usual transversely apertured hub to receive a turning bar, is journaled upon a stud projecting from the outer face of the mold section 27 and is meshed with a segmental set of crown gear teeth 56 formed on the adjacent margin of the locking ring.

The terminal mold section 28 at the left end of the set of mold members as viewed in Fig. 1 is secured and sealed to the ram head 15 instead of being secured to a section 27, and at the other end of the set the terminal mold section 27 is secured and sealed to the standard 22, so that they have suitable bearing upon and connection with the respective press-heads to withstand the pressure of the rams 13, 14, and so that suitable steam chambers are provided at the outer side of each end tire of the series.

In the operation of the apparatus steam is continuously circulated through the several chambers 31 so that the mold members are kept continuously at vulcanizing temperature, and the tire assemblies, each including the expansible core 40 and bead clamping rings 38, 39, are mounted in the mold cavities in succession, preferably by progression from one end of the set of mold members to the other, each vulcanized tire being replaced by an uncured tire as it is removed.

For the changing of tires in any given mold cavity, the locking ring 49 is unlocked from the lugs 53 by rotation, the ram cylinders 11, 12, are discharged, and the ram cylinder 16 is charged, drawing toward the standard 10 all of the mold members on that side of the tire which is to be removed. The change of tires being made, the cylinder 16 is discharged and the cylinders 11, 12, are charged, returning the withdrawn mold members toward those on the other side of the tire and thus closing the adjacent mold members upon the substituted tire, whereupon they are locked together by a reverse rotation of the locking ring 49. Each of the expansible cores 40 is of course connected up and disconnected with the manifold 43, by means of the quick-detachable coupling 48, and is subjected to the expanding pressure of fluid from the manifold 43 by opening the stop cock 42$^a$, at appropriate times during the operation.

As adjacent mold members are securely locked together, except those enclosing the particular cavity that is being opened, it is not necessary that the pressure of the rams 13, 14, be continuously maintained upon the set of mold members. Consequently the tire cavities can be opened by the application of a comparatively small force and without requiring elaborate equipment or extensive manual operations for that purpose. A substantial economy in floor space also is effected.

My invention is susceptible of modification within its scope, and I do not wholly limit my claims to the specific construction shown.

I claim:

1. Molding apparatus comprising a series of mold members so mounted as to be assembled in substantially aligned and abutted relation, means for securing adjacent members of the set together in such relation, and means for moving an end member of the set to move as a unit the said end member and other members secured thereto, the said securing means comprising a series of locking members adapted to lock the two mold members together at a multiplicity of positions about their peripheries and means for simultaneously moving said members into locking position.

2. Molding apparatus comprising a guide, a set of mold members mounted thereon, means for pressing a plurality of said members together while they remain on said guide, and means for locking adjacent members together while they are held by said pressing means, the said locking means being of the breech-block type.

3. Molding apparatus comprising a set of mold members so mounted as to be assembled in substantially aligned and abutted relation, means for locking adjacent members of the set together in such relation, and means for moving as a unit a plurality of the mold members so locked together without moving the rest of the set, the said locking means comprising a locking ring rotatably mounted upon one mold member and adapted to interlock with the adjacent mold member without relative rotary movement of the two mold members.

4. Molding apparatus comprising a pair of mold members, one of the same being formed with locking lugs and the other with a screw thread, and a locking ring screwed upon said thread and formed with locking lugs adapted to be interlocked with those of the mold member by rotation of the ring.

5. Molding apparatus comprising a series of horizontally aligned mold members, adjacent mold members being formed with mating annular mold cavities, a mold-supporting member under the mold members, means engaging the mold-supporting member at a position intermediate the end members of the series of mold members for supporting the said mold-supporting member, the said means being adapted to permit the passage of the mold members thereover, means for pressing mold members of the series together by a force applied through an adjacent member of the series, and means independent of the said pressing means for locking adjacent mold members of the series together in mated relation.

6. Molding apparatus comprising a horizontally aligned series of mold members, adjacent mold members of the series being formed with mating annular mold cavities, means for supporting the series of mold members and guiding them into and out of abutted relation, and locking means for securing adjacent mold members of the series to each other, the said locking means comprising a circumferential series of locking members adapted to lock the two mold members together at a multiplicity of positions about their peripheries and means for simultaneously moving the said locking members into locked position.

7. Molding apparatus comprising a pair of mold members, one of the same being formed with locking lugs and the other with a screw thread, a locking ring screwed upon said thread and formed with locking lugs adapted to be interlocked with those of the mold member by rotation of the ring, and means for supporting the two mold members in axially aligned and axially slidable relation to each other.

8. Molding apparatus comprising a pair of mold members, means of the breech-block type for securing them together, and means for supporting the mold members in axially aligned and axially slidable relation to each other.

In witness whereof I have hereunto set my hand this 24th day of August, 1925.

ROY D. FRITZ.